Patented Mar. 7, 1939

2,150,139

UNITED STATES PATENT OFFICE 2,150,139

FINISHING SYSTEM FOR ACOUSTICAL SURFACES

Herbert L. Wampner, Terre Haute, Ind., assignor to Commercial Solvents Corporation, Terre Haute, Ind., a corporation of Maryland No Drawing. Application September 17, 1937, Serial No. 164,332

3 Claims. (Cl. 91—68)

My invention relates to a finishing system for acoustical surfaces, and more particularly to a flock lacquer finishing system for such surfaces which will not substantially impair their acoustical properties.

Numerous architectural materials, such as extremely porous plasters, pressed wood paneling, and the like, have recently been developed which have outstanding properties in the absorption of sound, and which are employed in the construction of auditoriums, radio studios, and for other similar purposes, in order to obtain the desired acoustical effects. However, up to the present time no satisfactory finishing system has been devised for such materials since the ordinary coating systems tend to completely fill the interstices of the base material and thus destroy its acoustical properties.

I have now discovered a finishing system which avoids this difficulty and which produces finishes of extremely satisfactory appearance with substantially no diminution of acoustical properties. The method of finishing which is the subject matter of the present invention comprises, briefly, applying to the acoustical surface a coat of a liquid film-forming composition, preferably a cellulose derivative lacquer, having the property of gelling during the early stages of drying; at least partially drying this coat; subsequently applying a coat of a non-gelling coating material, also preferably a cellulose derivative lacquer, having solvent action on the gelled film-forming material of the first coat; and applying flock, or other finely divided insoluble material such as sand, mica, etc., to the latter coat while still wet. In accordance with this procedure the first coat serves as a sealer, thus preventing the second or flock adhesive coat from sinking into the porous surface unduly prior to application of the flock. The solvents in the second coat, however, attack the first or sealer coat during the drying of the flock finish, and enable it to flow from the pore openings, thus preventing substantial impairment of the acoustical properties.

In preparing the sealer in accordance with the present invention, a solvent mixture should be chosen which will secure complete solubility of the film-forming material during the preliminary stages of the application, but which will enable it to gel after evaporation of a portion of the solvent mixture. It is well known in the art that in the case of cellulose derivatives and certain other film forming materials the active solvents have limited tolerances for the latent solvents or diluents commonly employed in coating compositions. By choosing the proper type and proportion of latent solvent or diluent so that this portion of the solvent mixture will evaporate from the composition more slowly than the active solvent, it is thus possible to secure a composition which will constitute initially a clear solution, but which will gel during evaporation of the solvents. For the present purpose it is desirable that this gelling take place as early as possible in order to prevent sinking of the coating material and to secure sufficient temporary sealing of the large interstices of the base. For this reason it is desirable to have the material gel immediately after application or even in some cases during application. Thus, when applying the coating material by the spray method it is possible for sufficient solvent to evaporate in the atomizing step so that the material is actually partially gelled when it strikes the surface. However, if application by brushing or by other alternative means is employed, the solvent mixture may readily be formulated to secure gelling immediately after application.

In addition to the cellulose derivative, active solvent, and latent solvent or diluent, the coating material for the sealing operation may contain other normal constituents of lacquers, such as plasticizers, resins, dyes, pigments, and the like. For the less rigid types of base materials it will be desirable to employ a plasticizer, and for this purpose it is preferred to utilize a non-solvent plasticizer in order to insure gelling of the sealer. Resins are not necessary in the composition but may be employed if desired. Dyes or pigments will usually be unnecessary unless a light colored flock finish is to be employed on a dark colored base.

The second coat to be applied in my finishing system may comprise a lacquer containing the same film-forming material employed in the sealer coat, or may constitute any other type of finishing material containing active solvents for the film-forming material employed in the sealer coat. I prefer, however, to utilize the former type composition, utilizing a cellulose derivative in both coats, and to employ relatively slow evaporating solvents in order to provide sufficient time for application of the flock, and in order to attack the sealer coat sufficiently to enable the material to flow into the base, thus restoring the porous surface. Aside from the provision of the solvent to effect this end, the coating material for the second or flock adhesive coat may be formulated in the usual manner for such materials and may contain the usual ingredients for these finishes. The same considerations with respect to plasticizers, resins, pigments, and the like, apply to the second coat, which were discussed above with reference to the sealer coat, with the exception that a solvent type plasticizer is more desirable than a non-solvent type in the flock adhesive coat.

In applying my finishing system the sealer coat is first applied to the base and allowed to dry at least partially; the flock adhesive coat is then applied and while the latter is still wet the flock is applied in the usual manner. The sealer coat may be allowed to dry completely prior to the application of the remainder of the finishing system, but by applying the second coat before the sealer has completely dried, the solvents of the second coat may more readily attack the sealer, thus insuring a more porous final finish. After application of the flock, the finish may be air-dried at atmospheric temperature, or after a short drying period at such temperature the drying may be completed at an elevated temperature. The resulting finish gives the appearance of a uniform flock surface such as would be obtained upon glass or metal and is extremely satisfactory from a decorative standpoint. However, in spite of this appearance of uniformity the surface actually constitutes a mesh-like structure in which the flock fibers adhere only to the solid areas in the base surface planes, leaving the interstices open and thus preserving the acoustical properties.

The following examples will illustrate the application of my invention to the finishing of acoustical surfaces:

Example I

Sealer

| | Parts by weight |
|---|---|
| Nitrocellulose (¼ sec.) | 15 |
| Raw castor oil | 23 |
| Titanium dioxide | 15 |

Incorporated in 100 parts by weight of the following solvent mixture:

| | Per cent by volume |
|---|---|
| Acetone | 5 |
| Ethyl alcohol | 15 |
| Butyl alcohol | 15 |
| Toluol | 65 |

Flock adhesive coat

| | Parts by weight |
|---|---|
| Nitrocellulose (¼ sec.) | 12 |
| Titanium dioxide | 12 |
| Dibutyl phthalate | 9 |

Incorporated in 100 parts by weight of the following solvent mixture:

| | Per cent by volume |
|---|---|
| Ethyl acetate | 10 |
| Ethyl alcohol | 5 |
| Butyl alcohol | 15 |
| Butyl lactate | 20 |
| Toluol | 50 |

Example II

Sealer

| | Parts by weight |
|---|---|
| Nitrocellulose (5 sec.) | 10 |
| Raw castor oil | 10 |

Incorporated in 100 parts by weight of the following solvent mixture:

| | Per cent by volume |
|---|---|
| Methyl acetate | 5 |
| Ethyl alcohol | 15 |
| Butyl alcohol | 15 |
| Toluol | 65 |

Flock adhesive coat

| | Parts by weight |
|---|---|
| Nitrocellulose (5 sec.) | 5 |
| Alkyd resin (Rezyl #19) | 10 |
| Dibutyl phthalate | 2 |

Incorporated in 100 parts by weight of the following solvent mixture:

| | Per cent by volume |
|---|---|
| Butyl acetate | 30 |
| Monobutyl ether of ethylene glycol | 20 |
| Toluol | 25 |
| Petroleum naphtha (boiling range 95–135° C.) | 25 |

Example III

Sealer

| | Parts by weight |
|---|---|
| Cellulose acetate (acetyl No. 38–39) | 15 |
| Dibutyl phthalate | 5 |

Incorporated in 100 parts by weight of the following solvent mixture:

| | Per cent by volume |
|---|---|
| Acetone | 35 |
| Ethyl alcohol | 40 |
| Toluol | 35 |

Flock adhesive coat

| | Parts by weight |
|---|---|
| Cellulose acetate (acetyl No. 38–39) | 10 |
| Dibutyl tartrate | 2 |

Incorporated in 100 parts by weight of the following solvent mixture:

| | Per cent by volume |
|---|---|
| Methyl lactate | 50 |
| Ethyl alcohol | 20 |
| Toluol | 30 |

Example IV

Sealer

| | Parts by weight |
|---|---|
| Ethyl cellulose (20 centipoise) | 10 |
| Raw castor oil | 3 |

Incorporated in 100 parts by weight of the following solvent mixture:

| | Per cent by volume |
|---|---|
| Ethyl alcohol | 15 |
| Toluol | 35 |
| Petroleum naphtha (boiling range 130–150° C.) | 50 |

Flock adhesive coat

| | Parts by weight |
|---|---|
| Ethyl cellulose (20 centipoise) | 8 |
| Tributyl phosphate | 2 |

Incorporated in 100 parts by weight of the following solvent mixture:

| | Per cent by volume |
|---|---|
| Methylamylalcohol | 5 |
| Butyl alcohol | 25 |
| Coal tar naphtha (boiling range 130–170° C.) | 20 |
| Xylol | 50 |

Example V

Sealer for brush application

| | Parts by weight |
|---|---|
| Nitrocellulose (½ sec.) | 14 |
| Raw castor oil | 14 |

Incorporated in 100 parts by weight of the following solvent mixture:

| | Per cent by volume |
|---|---|
| Ethyl acetate | 10 |
| Butyl alcohol | 25 |
| Xylol | 65 |

Flock adhesive coat for brush application

| | Parts by weight |
|---|---|
| Nitrocellulose (½ sec.) | 14 |
| Dammar | 10 |
| Tricresyl phosphate | 6 |

Incorporated in 100 parts by weight of the following solvent mixture:

| | Per cent by volume |
|---|---|
| n-Butyl lactate | 45 |
| Petroleum naphtha (boiling range 150–200° C.) | 55 |

It is to be understood, of course, that the above examples are merely illustrative and do not limit the scope of my invention. Film-forming materials other than cellulose derivatives may be employed in the compositions if the film-forming material in the sealer is capable of gelling after evaporation of a portion of the solvents, and if the flock adhesive coat contains a solvent for the gelled film-forming material of the sealer coat. As has previously been pointed out, various equivalent materials may be substituted for the particular compound specified in the examples, and the compositions may be varied in accordance with known formulating practices as long as the gelling property of the sealer and the solvent property of the flock adhesive coat are provided for in order to secure the method of operation of the present invention. The use of any equivalent materials and any modifications of procedure which would naturally occur to one skilled in the art are to be considered as within the scope of my invention.

My invention now having been described, what I claim is:

1. A method for applying a decorative finish on a porous base, constituting an acoustical surface, with minimum effect upon its sound absorptive properties which comprises applying to said surface a sealer comprising a coating composition containing a film-forming material and a volatile solvent mixture containing a solvent and a non-solvent, said composition having the property of gelling after evaporation of a portion of the solvent mixture and before the sealer is able to flow from the outer openings of the pores into the base, allowing said composition to gel and at least partially dry, subsequently applying a flock adhesive coat comprising a coating composition containing sufficient solvent for the gelled film forming material of the sealer coat to enable said sealer to flow from the outer openings of the pores into the base, and applying flock to said flock adhesive coat while the latter is still wet.

2. A method for applying a decorative finish on a porous base, constituting an acoustical surface, with minimum effect upon its sound absorptive properties which comprises applying to said surface a sealer comprising a cellulose derivative lacquer having the property of gelling after evaporation of a portion of the solvents and before the sealer is able to flow from the outer openings of the pores into the base, allowing said lacquer to gel and at least partially dry, subsequently applying a flock adhesive coat comprising a coating composition containing sufficient solvent for the gelled cellulose derivative of the sealer coat to enable said sealer to flow from the outer openings of the pores into the base, and applying flock to the flock adhesive coat while the latter is still wet.

3. A method for applying a decorative finish on a porous base, constituting an acoustical surface, with minimum effect upon its sound absorptive properties which comprises applying to said surface a sealer comprising a nitrocellulose lacquer having the property of gelling after evaporation of a portion of the solvents and before the sealer is able to flow from the outer openings of the pores into the base, allowing said lacquer to gel and at least partially dry, subsequently applying a flock adhesive coat comprising a nitrocellulose lacquer containing sufficient high boiling nitrocellulose solvent to enable said sealer to flow from the outer openings of the pores into the base, and applying flock to said flock adhesive coat while the latter is still wet.

HERBERT L. WAMPNER.